(12) United States Patent
O'Connell et al.

(10) Patent No.: US 9,727,862 B2
(45) Date of Patent: Aug. 8, 2017

(54) SYSTEM AND METHOD FOR AUTHENTICATION USING PAYMENT PROTOCOL

(71) Applicant: Visa International Service Association, San Francisco, CA (US)

(72) Inventors: Craig O'Connell, San Mateo, CA (US); Kevin E. Wong, Sausalito, CA (US); Nancy Hilgers, Santa Cruz, CA (US); Mark Nelsen, Oakland, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 947 days.

(21) Appl. No.: 13/889,696

(22) Filed: May 8, 2013

(65) Prior Publication Data

US 2013/0304648 A1 Nov. 14, 2013

Related U.S. Application Data

(60) Provisional application No. 61/644,099, filed on May 8, 2012.

(51) Int. Cl.
*G06Q 20/38* (2012.01)
*G07C 9/02* (2006.01)
(Continued)

(52) U.S. Cl.
CPC ....... *G06Q 20/3821* (2013.01); *G06Q 20/409* (2013.01); *G06Q 20/4014* (2013.01);
(Continued)

(58) Field of Classification Search
CPC .......... G06Q 20/3821; G06Q 20/4014; G06Q 20/409; G07C 9/00103; G07C 9/00571
See application file for complete search history.

(56) References Cited

U.S. PATENT DOCUMENTS

| 6,003,014 A * | 12/1999 | Lee ...................... G06Q 20/105 705/13 |
| 6,877,094 B1 * | 4/2005 | DiGiorgio .............. G06Q 20/04 713/176 |
| 8,245,292 B2 * | 8/2012 | Buer ...................... G06F 21/34 713/172 |
| 8,527,427 B2 * | 9/2013 | Wankmueller ......... G06Q 20/40 235/379 |

(Continued)

FOREIGN PATENT DOCUMENTS

KR 10-2012-0022347 A 3/2012

OTHER PUBLICATIONS

PCT appl. No. PCT/US2012/040176, International Search Report and Written Opinion, mailed Sep. 23, 2013, 11 pages.

*Primary Examiner* — Mamon Obeid
*Assistant Examiner* — Edgar R Martinez-Hernandez
(74) *Attorney, Agent, or Firm* — Kilpatrick Townsend & Stockton LLP

(57) ABSTRACT

Methods, systems, and devices are disclosed for using a payment processing network as an authorization engine to access secure physical areas, such as college dormitories, office buildings. A keycard with a cryptogram generator is presented by a user to an access device, and the access device or associated computer sends an access request message formatted like a payment authentication request message to an aggregator/acquirer and payment processing network. The payment processing network validates the cryptogram and returns an access response message, again formatted like a payment authorization response message, indicating that the keycard is authentic. The gate, door, turnstile, or other barrier is then temporarily unlocked to let the user through.

13 Claims, 11 Drawing Sheets

(51) Int. Cl.
*G06Q 20/40* (2012.01)
*G07C 9/00* (2006.01)
(52) U.S. Cl.
CPC ..... *G07C 9/00103* (2013.01); *G07C 9/00571* (2013.01); *G07C 9/02* (2013.01)

(56) References Cited

U.S. PATENT DOCUMENTS

| | | | |
|---|---|---|---|
| 2006/0278704 A1* | 12/2006 | Saunders | G06Q 20/10 235/382 |
| 2007/0012763 A1* | 1/2007 | Van de Velde | G06Q 20/18 235/380 |
| 2007/0262139 A1* | 11/2007 | Fiebiger | G06Q 20/20 235/380 |
| 2008/0179394 A1* | 7/2008 | Dixon | G06Q 20/027 235/380 |
| 2009/0119213 A1* | 5/2009 | Hammad | G06Q 20/32 705/44 |
| 2009/0248526 A1 | 10/2009 | Park et al. | |
| 2009/0276344 A1* | 11/2009 | Maw | G06Q 20/04 705/30 |
| 2010/0057619 A1 | 3/2010 | Weller et al. | |
| 2010/0276487 A1 | 11/2010 | Radicella et al. | |
| 2011/0000962 A1* | 1/2011 | Chan | G06Q 20/20 235/382 |
| 2011/0208658 A1 | 8/2011 | Makhotin | |
| 2011/0246369 A1 | 10/2011 | De Oliveira et al. | |
| 2013/0151292 A1 | 6/2013 | Van Deloo et al. | |
| 2015/0348043 A1* | 12/2015 | Leger | G06Q 20/4016 705/44 |

\* cited by examiner

SYSTEM AND METHOD FOR AUTHENTICATION USING PAYMENT PROTOCOL

CROSS-REFERENCES TO RELATED APPLICATIONS

This application claims the benefit of U.S. Provisional Application No. 61/644,099, filed May 8, 2012, which is hereby incorporated by reference in its entirety for all purposes.

BACKGROUND

1. Field of the Art

Generally, the present application relates to data processing. Specifically, the application is related to using financial network data processing systems for non-payment, authentication-only services, such as for gaining access to physical areas.

2. Discussion of the Related Art

For access to physically secure areas with many entrances and exits, such as college dormitories and office buildings, keycards are often used. Individuals who are authorized to access the areas are each supplied with a keycard. To enter and exit each doorway, the individual swipes his or her keycard through a reader, or sweeps it near a wireless reader, so that the reader can read information from the keycard.

The information is fed to a local computer, and the computer determines whether the keycard, and the associated user, is registered in a database. If the keycard is registered, then a signal feeds back from the computer to the doorway to unlock it so that the user can enter or exit.

Unauthorized people who want access to the areas may be able to steal and/or duplicate copy one of the keycards. This can present a problem. Generally, a duplicate card cannot be discerned from an original card from a remote computer. An individual whose card has been surreptitiously duplicated may not realize that his or her card has been duplicated. Meanwhile, an unauthorized person may use the card to access the area many times with impunity before being caught, if ever being caught.

A university or office building with a keycard system generally accepts the risk that a keycard here or there might be stolen and duplicated. Those who have the means and knowledge to surreptitiously duplicate such electronic cards do not ordinarily set out to do so, and the benefit of doing so is often small compared with the risks. However, in some instances in which the benefits are high or the consequences of a breach are incalculable, one may wish for a better security system.

Secure keycard systems are available on the open market through third party brokers. A database system containing the list of authorized keycards is usually located in the same building, building complex, or campus as the doorway readers. Because of this local placement, once the system is installed and purchased from a broker, the purchaser is typically on its own to issue and validate keycards to users. The company from which the keycard system is purchased may maintain and update the system, but tactical decisions as to what cards are authorized or not are generally left to the installed, automated system under observation by the purchaser.

There exists a need in the art for better security systems that can reduce the risk of duplicated keycards or other such devices.

BRIEF SUMMARY

Generally, authentication of individuals is described using a payment protocol in a payment processing network for non-payment related authentication, including access to physical areas. An access terminal formats a request for entry into a message format compliant with financial authorization messages, such as International Standards Organization (ISO) 8583, and the message is sent to a payment processing network, such as Visa. The payment processing network determines from content within the message whether the individual who presented the data is authorized by authenticating the data in the message. Because the message is recognized as a non-payment message, no forwarding of the message to an issuer, such as is done for normal payment transactions, is performed. Instead, after authentication of the data, a response message is sent back to the access device. The access device may then unlock a door, etc. to allow a user to enter the physical area.

Authentication data can come from a card, mobile phone, or other portable consumer device that the user slides or scans near a reader of the access device. Data from the portable consumer device can be static or dynamic. That is, the data can remain the same or can change each time that the portable consumer device is presented for authentication. A cryptogram generated by the portable consumer device may be part of the authentication data and can change based on an internal counter, time of day, or other seed value.

The payment processing network can be configured to both process a request for access as well as an authorization request for a payment, which may or may not be unrelated. Both access and payment may involve comparing cryptograms generated on portable consumer devices to those generated in back-end servers.

Some embodiments of the present application are related to methods for authorizing access to an access terminal using a payment processing network, the method including receiving from an access terminal, by one or more server computers in a payment processing network, an access request message comprising authentication data having a format that is the same as a format for a payment authorization request message for a payment transaction, analyzing, by the one or more server computers, the authentication data in the access request message, determining, by the one or more server computers, that the authentication data is associated with a user that wants access to a location associated with the access terminal, preparing an access response message based on the determination, and transmitting the access response message to the access terminal.

The method can include an access request message that is free of a transaction amount, and the authentication data can include an account identifier of the user. The account identifier can include a primary account number (PAN) and the determining operation can comprise extracting a bank identification number (BIN) from the PAN and matching the BIN with an entry in a lookup table.

The authentication data can include a first cryptogram and be from a portable consumer device read by the access terminal, and the method can include calculating, at the one or more server computers, a second cryptogram, and comparing the first cryptogram to the second cryptogram to authenticate the portable consumer device, wherein the access response message is based on the comparison.

Some embodiments are related to a method for granting access to an area at an access terminal, the method including reading, at an access terminal, authentication data from a user, formatting, using a processor operatively coupled with a memory, the authentication data in a format that is the same as a format for a payment authorization request message for a payment transaction, sending the access request message to one or more servers of a payment processing network, receiving an access response message from the one or more servers of the payment processing network in response to the access request message, determining, using the processor, from the access response message whether the user is authentic, and unlocking a barrier based on an indication in the access response message that the user is authentic.

The method can include addressing a first application identifier (AID) on a portable consumer device for the access request message and addressing a second AID on the portable consumer device for the second payment authorization request message.

Some embodiments are related to a system for authorizing access to an area using a payment processing network, the system including a portable consumer device having a processor, a memory operatively coupled with the processor, an account identifier stored in the memory, and a sequence number stored in the memory, wherein the processor is operable to calculate a first cryptogram based on the sequence number. The system also includes one or more server computers of a payment processing network, the one or more servers configured to receive an access request message having the account identifier and first cryptogram, calculate a second cryptogram based on a locally stored sequence number, compare the first and second cryptograms to resolve whether the portable consumer device is authentic, determine from the account identifier that the access request message is associated with a user that wants access to a location associated with an access terminal, prepare an access response message based on the determination, and transmit the access response message to the access terminal.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

DETAILED DESCRIPTION

Universities, office buildings, and other entities with secure areas for many personnel may wish to outsource not only the design and installation of their keycard systems but also tactical authentication of each entry and/or exit throughout the day. A ubiquitous infrastructure exists for merchants to authorize payment transactions, and this infrastructure can be leveraged for access authorization.

For example, a card with an authentication identifier (ID) and financial-grade cryptogram generator can be swiped at a terminal to access a dormitory at a university. A cryptogram can be generated using the same process in the card as is used in financial transaction cards. This authentication D and cryptogram are then transmitted to a payment processing network. The payment processing network validates the cryptogram and authentication ID and then returns an authentication response back to the dormitory terminal. The authentication response informs the university whether the presenter should be allowed access to the dormitory.

Figure 1:
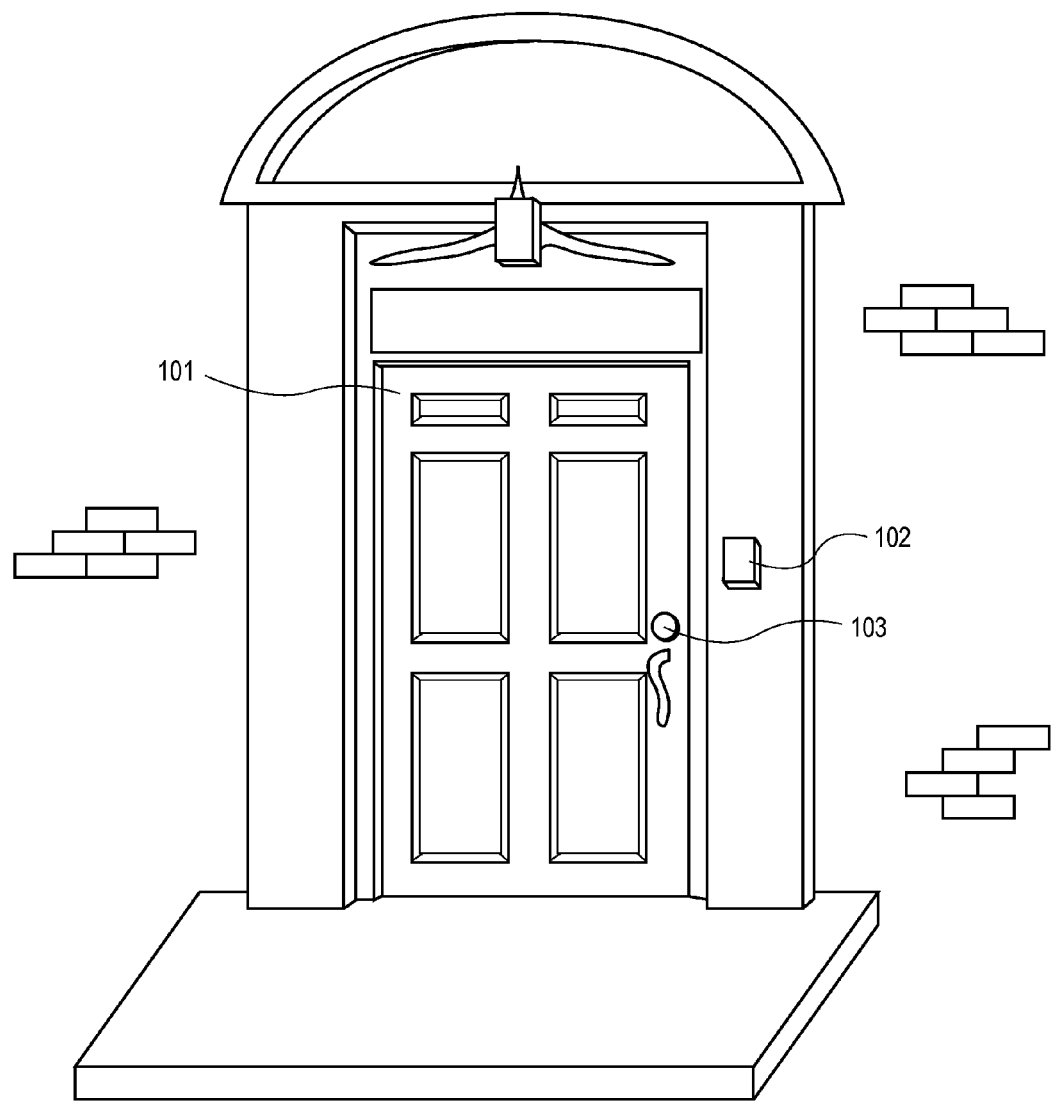
FIG. 1 illustrates an entrance and reader in accordance with an embodiment.

FIG. 1 illustrates an entrance to a college dormitory and associated reader in accordance with an embodiment. To gain access through door 101, a student at the college can hold his or her college-issued keycard or near-field communication (NFC)-enabled mobile device up to access terminal reader 102. Reader 102 then sends a signal to a local computer with data from the student's device to request that the door be unlocked. The local computer then forwards the data, in the same format as a credit card payment authorization message, to a third party acting as an acquirer for forwarding to a payment processor. This will be described in detail below. Once the student's data is validated as authorized by the payment processor, a signal can be sent to lock 103 to unlock door 101. A signal may also be sent to reader 102 to display that access is approved.

A physical card or other portable consumer device is not necessary in some embodiments, such as those using biometrics. For example, a student may press his finger on a pad, or look through a viewfinder to initiate a retinal scan, in order to enter a building. The authentication information may involve sending a subset of the biometric data, such as fingerprint ridge, loop, lake, delta, and fork features, to a server.

"Authentication data" include data, digital or analog, for determining whether a user or an associated device is what he, she, or it claims to be, or as otherwise known in the art. Authentication data can include biometric data associated with a user who is authorized to enter a secure area. It can also include an account number or identifier of an accountholder and a personal identification number (PIN), card verification value (CVV), cryptogram generated from a seed, or other confidential code nominally known by no one else except the accountholder and the entity relying upon the authentication.

Authentication data can be packaged in a payment authentication message format, such as that specified by International Standards Organization (ISO) 8583. Many ATMs use ISO 8583 at some point in the their communications as well as point of sale (POS) terminals in retail stores. Visa and MasterCard payment processing networks base their authorization communications on the ISO 8583 standard as well as other institutions and networks.

Figure 2:
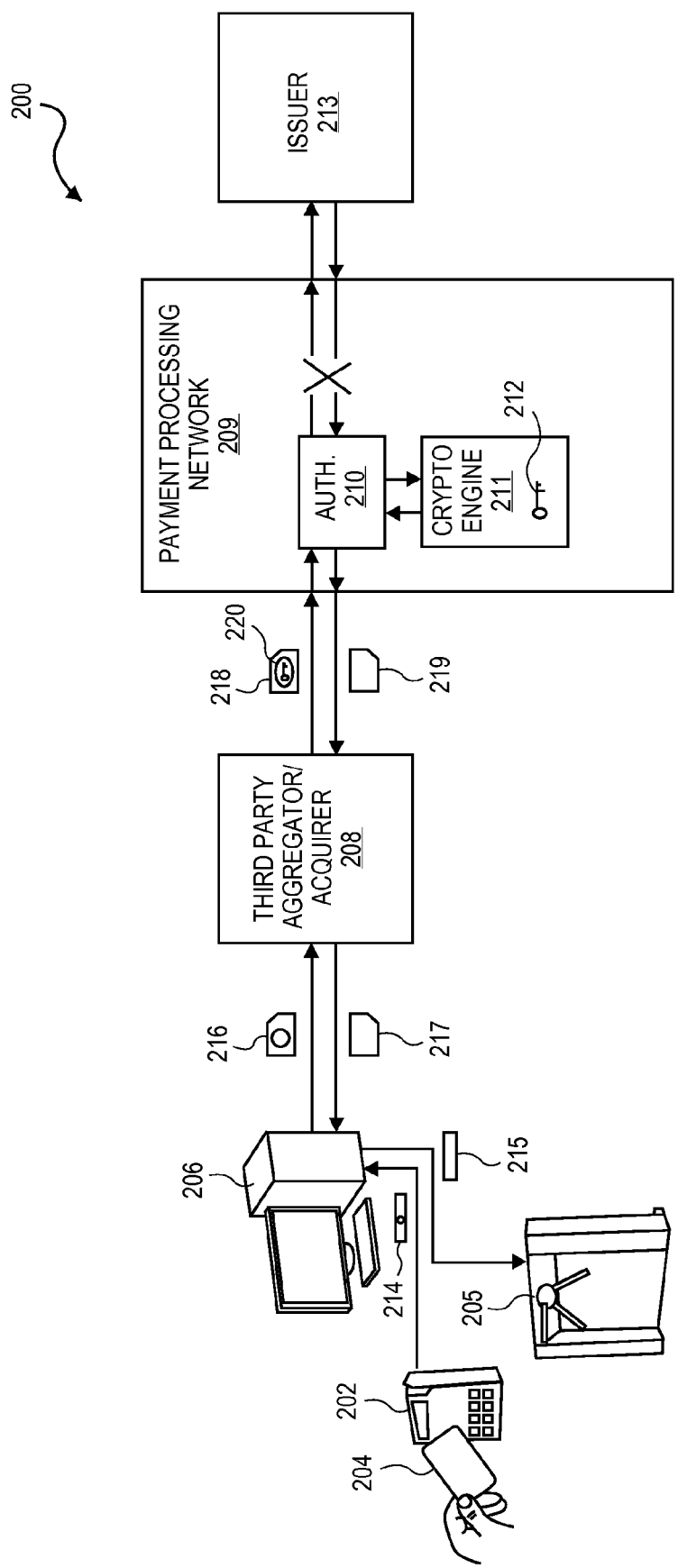
FIG. 2 illustrates a payment processing system conducting access processing in accordance with an embodiment.

FIG. 2 illustrates a payment processing system conducting access processing in accordance with an embodiment.

To access an area, a user presents card 204 to access terminal reader 202. The reader reads information from the card, including an account number, the name of the individual, a cryptogram, and other authentication data or data to be used to build authentication data. Signal 214 is sent from reader 202 to a relying party's computer 206. Signal 214 includes all or some of the information read from the card.

The relying party's computer 206 runs software from a broker service to manage user records and user access. The relying party's computer 206 sends message 216 to third party aggregator/acquirer 208 with the authentication data. Either the reader 202, relying party's computer 206 or third party aggregator/acquirer 208 formats the message so that it is in a format that is the same as a format for a payment authorization request message for a payment transaction.

Card 204 is the size of a common CR-80 credit card, namely ID-1 conforming to International Standards Organization (ISO)/International Electrotechnical Commission (IEC) standard 7810. In some embodiments, a key fob or mobile phone can be used instead of a card.

A "format for a payment authorization request message" for a payment transaction includes an arrangement of data fields (disregarding content of the data fields) that is sufficient to be accepted as syntactically correct for an automated payment processing network. The data fields may be specified as having a certain number of bits, bytes, words, etc. and in a predetermined order. There may be metadata within a subset of the data fields that describes a length, valid characters or codes, or other specifications of other data fields. One generally accepted format for payment authorization request messages is that of ISO 8583, as described above and as known in the art.

Signal 214 from reader 202 to relying party's computer 206, which may be a digital message, may already be formatted like a payment authorization request message. Message 216 may be formatted like a payment authorization request message by relying party's computer 206. Moreover, access request message 218 from third party aggregator/acquirer to one or more server computers of payment processing network 209 has authentication data in a form at that is the same as a format for a payment authorization request message for a payment transaction.

At payment processing network 209, authentication data 220 in access request message 218 is analyzed to determine whether authentication data 220 is associated with a user that wants access to a location associated with access terminal reader 204. For example authorization engine 210 analyzes a primary account number (PAN) of authentication data 20 and extracts a six-digit bank identification number (BIN) from the PAN. The server computers then match the BIN with an entry in a predefined lookup table.

The table of BINs includes a subset of bank identification numbers that are not identifiers of banks at all, but rather third party aggregator/acquirers. These third party aggregator/acquirers may maintain a map of a relying party's user credentials to a keycard number, map user IDs to reader/terminal IDs, perform browser or plug-in validation, perform reader validation, and send card data to a credential service provider, such as a payment processing network, for validation. The BIN of authentication data 220 matches that of a third party aggregator/acquirer 208.

In some embodiments, authentication data 220 contains only the following items: a client identifier, a client transaction identifier, a primary account number as an account identifier, a card sequence number, an expiration date, an indicator for track 2 data, a currency code for a transaction amount, an indicator of minor units for the transaction amount, and a value of the transaction amount. Other fields may be optional.

Access request message 218 may be "free of a transaction amount." For example, a field normally used for a transaction value may be zero or null. As another example, metadata elsewhere in the message may flag the field as invalid, and the field may essentially contain garbage data.

Authorization engine 210 suppresses routing of request message 220 to issuer 213. "Suppressing" routing can include redirecting or interrupting a transmittal of a message. Instead, because the BIN matches that of a third party aggregator/acquirer, a cryptogram in authentication data 220 is compared with one that is locally calculated. The cryptogram in authorization engine 211 is calculated using a local copy of the card sequence number as the seed. In other embodiments, the current time, a transaction number, or other number that varies between transactions can be used as a seed.

If the cryptogram from the received authentication data 220 matches cryptogram 212 computed by cryptogram engine 211, then authentication data 220 is deemed validated.

In some embodiments, validating or authenticating the authentication data may involve verifying a password or personal identification number (PIN), fingerprint, retinal scan, or other data against a database. Because this data is presumably only known to or possessed by an authorized user, it can be an indication that the authorized user is at the access terminal.

Access/authorization response message 219 is prepared by the server computers of payment processing network 209 with an indicator that authentication data 220 has been authenticated. Access response message 219 is in an ISO 8583 format with a message type indicator (MTI) of 0110: issuer response. At third party aggregator/acquirer 208, authorization response message 219 is forwarded as authorization response message 217 to relying party's computer 206.

Signal 215 is sent from relying party's computer 206 to turnstile 205 in response to a receipt of authorization response message 217. Signal 215 may be an exact copy or simple forwarding of authorization response message 217. Turnstile 205 is temporarily unlocked based on signal 215 in order to let the authorized user pass.

Naturally, the same payment processing network 209 can be used for payment transactions. That payment processing network 209 can be used for both payment transactions as well as access transactions is useful in that duplicate infrastructures can be avoided and the same, high-security techniques used for credit and debit card transactions can be used to control access to areas. Technical advantages include not only this but that universities, office buildings, and other entities can rely upon highly secure and well-thought out security procedures, such as those pioneered by Visa, for access control.

In some embodiments, the same card 204 can be used for a payment transaction by accessing a different application identifier (AID) on the card. That is, for access to an area, the card reader may activate a first AD on the card. For a payment transaction, a point of sale terminal may activate a second AID on the card. The card may be configured with multiple AIDs for access, payments, etc.

For a payment transaction, cryptogram engine e 211 can be used. A cryptogram 212 generated by cryptogram engine 211 for a payment card transaction may have the same length, format, etc. as one generated for an access request.

Cards that are configured for more than access can initiate closed loop payments, open loop payments, or other payments as is known in the art.

Figure 3:
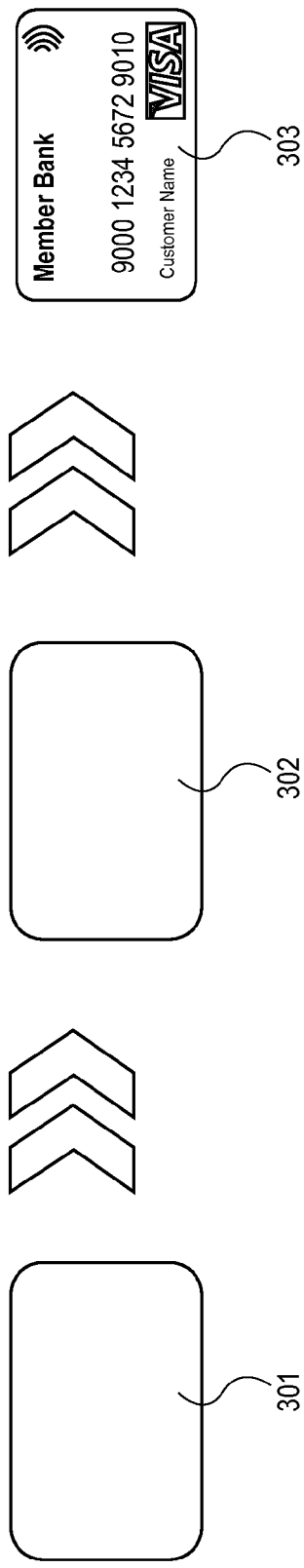
FIG. 3 shows a portable consumer device configured to provide three different stages of authentication and payment capabilities.

FIG. 3 shows an exemplary embodiment of a series of portable consumer devices 300, each showing the features included in the three different stage settings for the portable consumer device.

A stage 1 portable consumer device 301 may comprise an authentication identifier element and a payment identifier element. The authentication identifier element may be configured to communicate with general access devices (e.g. contactless readers) and may be capable of authentication transactions. The payment identifier element may be capable of performing payment transactions, but the payment identifier element may be disabled or otherwise configured so as not to allow the processing of payment transactions. For example, an AID for payment processing may be disabled on the card. Accordingly, the portable consumer device may be configured to only process access authentication transactions.

A stage 2 portable consumer device 302 may comprise an authentication identifier element and a payment identifier element. The authentication identifier element may be the same as the stage 1 portable consumer device 301, but the payment identifier element may be configured to process payment transactions with a group of selected contactless readers. This may be referred to as closed loop payment functionality. The payments are closed loop because the payment transactions may only be initiated for a select group of readers. A third party processor may communicate with the issuing bank or the transaction may be processed through typical payment processing channels.

For example, the relying party may program the system to allow payment transactions at a relying party's gift shop, book store, or cafeteria. Accordingly, a university student may be able to not only use the portable consumer device in an authentication transaction in order to gain entry to their dormitory, but he or she may also use the portable consumer device to buy dinner at the university's cafeteria. However, the closed loop portable consumer device would not be able to process a transaction at any other terminal that other credit or debit cards may be able to communicate with. For example, the student could not use the portable consumer device at the local gas station.

A stage 3 portable consumer device 303 may comprise an authentication identifier element and a payment identifier element. The authentication identifier element may be the same as described above. However, the payment identifier element may be enabled to communicate with any access device in order to process a purchase transaction. Accordingly, any operable merchant that has the capability of performing contactless transactions with the payment processing network may process payment transactions initiated by the stage 3 portable consumer device 303. This may be referred to as open loop payment functionality. The payments are open loop because the payment transactions may initiated with any access device that is configured to process payment transactions for a particular payment processing network. For instance, using the example above, not only would the student be able to use the portable consumer device to enter their dormitory and purchase dinner at the cafeteria, but the portable consumer device could also be used to fill up his or her car with gasoline at the gas station.

Although the cards look different between Stages 2 and 3 in the figure, one or ordinary skill in the art would recognize that the cards could all look the same with each stage so that no upgrading or trade-in would be necessary if a relying party upgraded or downgraded their system capabilities. Instead, the payment identifier element may be reconfigured or altered to enable or disable the processing of payment transactions. Accordingly, the authentication system can be easily upgradable and scalable. Additionally, the infrastructure investment is protected because the system can provide a solution that is adaptable to a systems growing or changing needs, whether used with access devices, point of sale devices, ATMs, etc.

As used herein, an "access device" may be any suitable device for communicating with a relying party computer or payment processing network, and for interacting with a payment device, a user computer apparatus, and/or a user mobile device. A payment device may generally be located in any suitable location, such as at the location of a merchant. An access device may be in any suitable form. Some examples of payment terminals include point of sale (POS) devices, cellular phones, personal digital assistant (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device or payment terminal may use any suitable contact or contactless mode of operation to send or receive data from, or associated with, a payment device and/or a user mobile device. In some embodiments, where a payment terminal may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

As used herein, an "authorization system" may refer to a system, a device, or components of a device that may utilize information to determine the probability or likelihood that a payment or access transaction is fraudulent. Although the term "merchant processor" may be referred to separately from an "authorization system" in portions of this disclosure, in some embodiments they may comprise one and the same system or systems that may perform substantially the same functionality, but in relation to different components of the system (e.g. providing information to a merchant or an issuer). In some embodiments, authorization systems may quantify the probabilities or likelihood of a fraudulent transaction by generating a "risk score." In some embodiments, the authorization system may approve or reject a transaction. An exemplary embodiment of an authorization system is provided in U.S. Pat. No. 7,809,650 to Bruesewitz et al. entitled "Method and System for Providing Risk Information in Connection with Transaction Processing," which is hereby incorporated by reference in its entirety. It should be understood that embodiments are not so limited.

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's payment terminal (e.g. POS equipment) that indicates approval of the transaction. The code may serve as proof of authorization. As noted above, in some embodiments, a payment processing network may generate or forward the authorization response message to the merchant.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

As used herein, the term "comprising" is not intended to be limiting, but may be a transitional term synonymous with "including," "containing," or "characterized by." The term "comprising" may thereby be inclusive or open-ended and does not exclude additional, un-recited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As used herein, an "electronic wallet" or "digital wallet" can store user profile information, payment information, bank account information, and/or the like and can be used in a variety of transactions, such as but not limited to eCommerce, social networks, money transfer or personal payments, mobile commerce, proximity payments, gaming, and/or the like for retail purchases, digital goods purchases, utility payments, purchasing games or gaming credits from gaming websites, transferring funds between users, and/or the like.

As used herein, "identification information" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVV3 card verification values, etc. A CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors).

As used herein, a "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

As used herein, an "online purchase" can be the purchase of a digital or physical item or service via a network, such as the Internet.

As used herein, a "payment account," which may or may not be associated with one or more payment devices, may refer to any suitable payment account including a credit card account, a checking account, a prepaid account, or other account from which payments can be made.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smart card, the payment device may also optionally have features such as magnetic stripes. Such devices can operate in either a contact or contactless mode. An exemplary payment device is described below.

As used herein, "payment transaction data/information" or "purchase transaction data/information" may refer to any information corresponding to or describing purchases, orders, invoices, payments involving goods, items, services, and/or the like, and may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like.

As used herein, a "promotional offer" may be media and/or non-media marketing communications employed for a pre-determined, limited time, or indefinitely to increase consumer demand, stimulate market demand or improve product availability. Examples include contests, coupons, premiums, prizes, discounts, rebates, and/or the like.

As used herein, a "risk score" may include an arbitrary designation or ranking that represents the risk associated that a transaction may be fraudulent. The risk score may be represented by a number (and any scale), a probability, or in any other relevant manner of conveying such information. The risk score may comprise an aggregation of information about a transaction, including transaction information, account information, and verification information as defined above. The risk score may be used by any authorizing entity (such as a merchant or an issuer) in determining whether to approve a transaction. The risk score may comprise and/or utilize both current transaction information and past transaction information, and may weight such information in any suitable manner.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

As used herein, "short range communication" or "short range wireless communication" may comprise any method of providing short-range contact or contactless communications capability, such as RFD, Bluetooth™, infra-red, or other data transfer capability that can be used to exchange data between a payment device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g., to a range of less than 1 meter, less than 10 centimeters, or less than 2.54 centimeters) for security, technical, and/or practical considerations. For instance, it may not be desirable for a POS terminal to communicate with every payment device that is within a 2 meter radius because each of those payment devices may not be involved in a transaction, or such communication may interfere with a current transaction involving different financial transaction devices. Typically the payment device or the access device also includes a protocol for determining resolution of collisions (i.e., when two or more payment devices are communicating with the access device simultaneously). The use of short range communications may be used when the merchant and the consumer are in close geographic proximity, such as when the consumer is at the merchant's place of business.

As used herein, "transaction information" may refer to any suitable information associated with a financial transaction, such as a transaction amount, a merchant identifier for a merchant associated with the transaction, the volume of the transaction, information about the goods or services being purchased, the merchant location, and any other information that is related to the current transaction.

As used herein, a "verification token" may refer to a secured device or component of a device (such as a software or hardware module) that may be used to authenticate or validate a user or payment device. That is, for example, the verification token may refer to a secured component (or components) of a mobile device used to determine that a user is not misrepresenting his identity and/or that he has in his possession a payment device. An example of a verification token is provided in U.S. Pat. No. 7,891,560, issued Feb. 22, 2011, to Hammad, which is hereby incorporated by reference in its entirety. In general, a verification token may take any suitable form, including an embedded software/hardware module in a mobile device or an attachment to a mobile device (such as a universal serial bus (USB) stick or other periphery component). As used herein, a verification token that is coupled to, or embedded within, a mobile device may be considered a component of the mobile device (even if the verification token could be physically separated from the mobile device). In some embodiments (e.g. where the verification token is an external component), a verification token that may be coupled to or embedded within a mobile device may utilize short-range communication (such as near-field communication including RFD or Bluetooth®) or a physical interface (such as through the use of a magnetic strip reader) to obtain information stored on a payment device. As contemplated herein, this comprises the mobile device "interacting" with the payment device (albeit through a component that may be separately identified as the verification token).

Provided below is a description of an exemplary system in which embodiments provided herein may be utilized. Although some of the entities and components may be depicted as separate, in some instances, one or more of the components may be combined into a single device or location (and vice versa). Similarly, although certain functionality may be described as being performed by a single entity or component within the system, the functionality may in some instances be performed by multiple components and/or entities (and vice versa). Communication between entities and components may comprise the exchange of data or information using electronic messages and any suitable electronic communication medium and method, as described below.

As used herein, an "issuer" may typically refer to a business entity (e.g., a bank or other financial institution) that maintains financial accounts for a user and often issues a payment device such as a credit or debit card to the user. As used herein, a "merchant" may typically refer to an entity that engages in transactions and can sell goods or services to the user. As used herein, an "acquirer" may typically refer to a business entity (e.g., a commercial bank or financial institution) that has a business relationship with a particular merchant or similar entity. Some entities can perform both issuer and acquirer functions.

Figure 4:
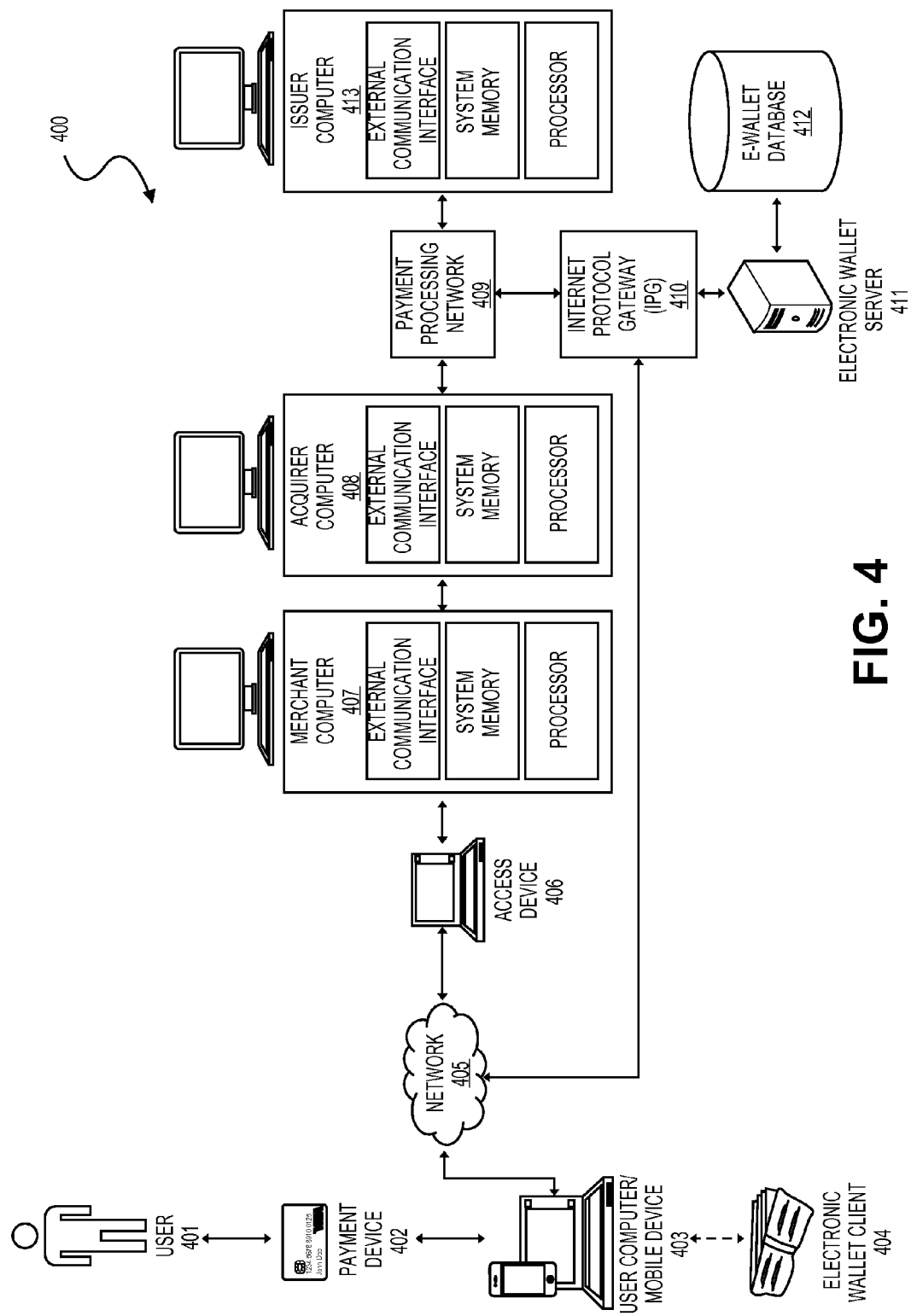
FIG. 4 illustrates a payment processing system conducting payment processing in accordance with an embodiment.

FIG. 4 shows an exemplary financial transaction system with a payment processing network in accordance with an embodiment. The system 400 may include one or more merchants, one or more access devices 406, one or more payment devices 402, one or more acquirers, and one or more issuers. For example, the system 400 may include a merchant having a merchant computer 407 that comprises an external communication interface (e.g., for communicating with an access device 406 and an acquirer computer 408), system memory comprising one or modules to generate and utilize electronic messages, and a data processor (for facilitating a financial transaction and the exchange of electronic messages); an acquirer having an acquirer computer 408 that comprises an external communication interface (e.g., for communicating with a merchant computer 407 and a payment processing network 409), system memory comprising one or modules to generate and utilize electronic messages, and a data processor (for facilitating a financial transaction and the exchange of electronic messages); and an issuer having an issuer computer 413 that comprises an external communication interface (e.g., for communicating with a payment processing network 409), system memory comprising one or modules to generate and utilize electronic messages, and a data processor (for facilitating a financial transaction and the exchange of electronic messages). The external communication interface of the merchant computer 407 may be coupled to an access device 406 (such that information may be received by the access device 406 and communicated to the merchant computer 407) or, in some embodiments, the access device 406 may comprise a component of the merchant computer 407.

As used in this context, an "external communication interface" may refer to any hardware and/or software that enables data to be transferred between two or components of the system 400 (e.g., between devices residing at locations such as an issuer, acquirer, merchant, payment processing network 409, etc.). Some examples of external communication interfaces may include a modem, a network interface (such as an Ethernet card), a communications port, a Personal Computer Memory Card International Association (PCMCIA) slot and card, or the like, Data transferred via external communications interface may be in the form of signals which may be electrical, electromagnetic, optical, or any other signal capable of being received by the external communications interface (collectively referred to as "electronic signals" or "electronic messages"). These electronic messages that may comprise data or instructions may be provided between one or more of the external communications interface via a communications path or channel. As noted above, any suitable communication path or channel may be used such as, for instance, a wire or cable, fiber optics, a telephone line, a cellular link, a radio frequency (RF) link, a Wide Area Network (WAN) or local area network (LAN) network, the Internet, or any other suitable method.

As would be understood by one of ordinary skill in the art, any suitable communications protocol for storing, representing, and transmitting data between components in the system 400 may be used. Some examples of such methods may include utilizing predefined and static fields (such as in core TCP/IP protocols); "Field: Value" pairs (e.g., hypertext transfer protocol, file transfer protocol, simple mail transfer protocol, post office protocol 3, and session initiation protocol); an extensible markup language based format; and/or Tag-Length-Value format.

As shown in the exemplary system 400 in the figure, information from the payment device 402 may be provided to access device 406 either directly (e.g., through a contact or contactless interface) or indirectly through a user computer or mobile device 403 (e.g., in an e-commerce environment or other indirect transaction) via network 405 (such as the Internet). In some embodiments, the user computer or mobile device 403 may interact with the payment processing network 409 (or other entity in the system 400) via the network 405 to form a first communications channel, such as through an Internet Protocol Gateway (IPG) 410. The IPG 410 may be in operative communication with the payment processing network 409. Although the IPG 410 is shown as being a separate entity in the figure, the IPG 410 could be incorporated into the payment processing network 409, or could be omitted from the system 400. In the latter situation, the first communications channel could directly connect the payment processing network 409 and the user computer or mobile device 403. In general, providing communication from the user 401 to the payment processing network or other entity may enable a variety of increased functionalities to the user 401, such as advanced authentication and verification methods (particularly in e-commerce and similar transactions), examples of which are described in U.S. Pat. No. 7,891,560, issued Feb. 22, 2011, and U.S. Patent Application Publication No. 2012/0023567 A1, published Jan. 26, 2012, each of which is incorporated by reference herein in its entirety. However, embodiments are not so limited.

In some embodiments, an electronic or digital wallet (i.e., "e-Wallet") may be utilized as a payment device for conducting a financial transaction. As shown in the figures, such exemplary systems may comprise an electronic wallet server 411, which may be accessible to the user 401 via network 405 (either directly connected or through an IPG 410) and may also be in operational communication with a merchant and/or with a payment processing network 409 (or in some embodiments, the electronic wallet server 411 may comprise a part of the payment processing network 409). The electronic wallet server 411 may be programmed or configured to provide some or all of the functionality associated with conducting transactions using an electronic wallet, including maintaining an association between the user's e-wallet and one or more payment accounts (such as a bank account or credit card account) in E-Wallet database 412. To provide electronic wallet services (La, the use of the electronic wallet associated with a payment account to conduct a financial transaction), the electronic wallet server 411 may further provide a web interface (e.g., through one or more web pages) to receive and transmit requests for payments services and/or may provide an application program interface (API) (shown as electronic wallet client 404) at the user computer apparatus 403 to provide the web service. This process is described in more detail in International Application Publication No. WO 2012/116125 A1, published Aug. 30, 2012, which is incorporated herein by reference in its entirety.

As noted above, the user's electronic wallet may be stored in the E-Wallet database 412, which may include information associated with the user's payment accounts that can be used in conducting a financial transaction with a merchant. For example, the E-Wallet database 412 may include the primary account numbers of one or more payment accounts (e.g., payment accounts associated with a credit card, debit card, etc.) of the user 401. The e-wallet may be populated with such information during an initial enrollment process in which the user 401 enters information regarding one or more of the payment accounts that may be associated with various issuers. Once the payment account information is added to the E-Wallet database 412, the user 401 may perform transactions by utilizing only his e-wallet. When a user 401 performs a transaction using his electronic wallet, the user 401 need not provide the merchant with payment account information but may instead provide the electronic wallet information. This information may then be included in an authorization request message, which in turn may be provided to payment processing network 409. The payment processing network 409 may then access the user's e-wallet via a request to the electronic wallet server 411, or may have direct access to the e-wallet database 412 so as to obtain the corresponding payment account information indicated by the information in the authorization request message.

The electronic wallet client 404 may comprises any suitable software that provides front end functionality of the electronic wallet to the user 401. For example, the electronic wallet client 404 may be embodied as a software application downloadable by a computer apparatus or mobile device 402 (e.g., a mobile phone). In some instances, the electronic wallet client 404 may provide a user interface (such as a series of menus or other elements) that allows the user 401 to manage his electronic wallet(s) (i.e., the electronic wallet client 404 may enable interaction with the electronic wallet server 411, and thereby the e-wallet database 412). In some embodiments, the electronic wallet client 404 may store data in a computer readable memory for later use, such as user 401 preferences or identifiers associated with funding sources added to the electronic wallet.

A payment processing network 409 may be disposed between the acquirer computer 408 and the issuer computer 413 in the system 400. The components of an exemplary payment processing network 409 are described below with reference to FIG. 5 for illustration purposes. Furthermore, the merchant computer 407, the acquirer computer 408, the payment processing network 409, and the issuer computer 413 may all be in operative communication with each other (i.e., although not depicted in the figure, one or more communication channels may exist between each of the entities, whether or not these channels are used in conducting a financial transaction).

The payment processing network 409 may include data processing subsystems, networks, and operations used to support and deliver authorization services, exception file services, and clearing and settlement services. For example, the payment processing network 409 may comprise a server computer, coupled to a network interface (e.g., by an external communication interface), and a database(s) of information. An exemplary payment processing network may include VisaNet™, CYBERSOURCE, AUTHORIZE.NET, PLAYSPAN, etc. Payment processing networks such as VisaNet™ are able to process credit card transactions, debit card transactions, and other types of commercial transactions. VisaNet™, in particular, includes a VIP system (Visa Integrated Payments system) that processes authorization requests and a Base II system which performs clearing and settlement services. The payment processing network 409 may use any suitable wired or wireless network, including the Internet.

Although many of the data processing functions and features of some embodiments may be present in the payment processing network 409 (and a server computer therein), it should be understood that such functions and features could be present in other components such as the issuer computer 413, and need not be present in the payment processing network 409, or a server computer therein.

Figure 5:
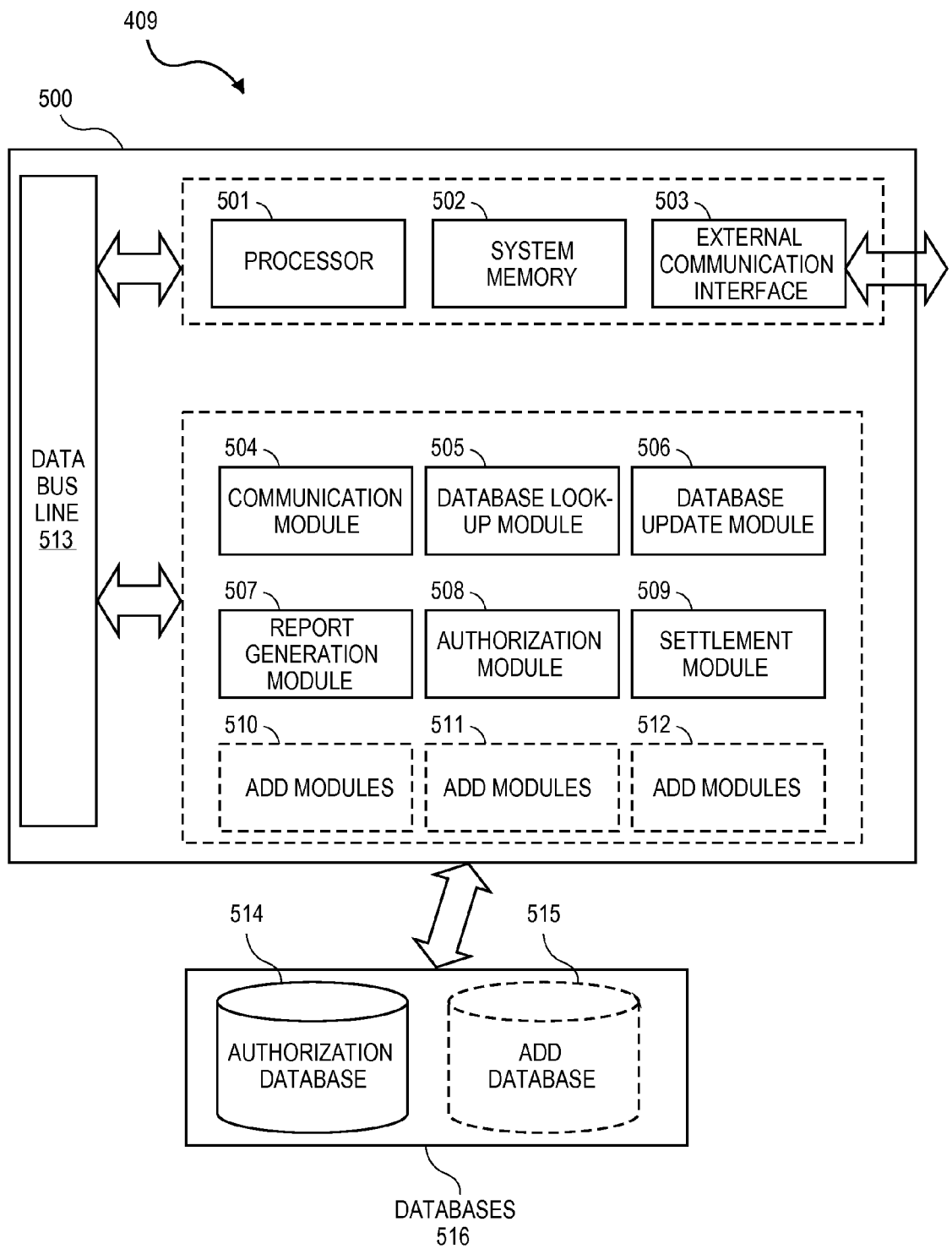
FIG. 5 shows a block diagram of an exemplary system comprising a server computer in accordance with some embodiments.

In FIG. 5, an exemplary server computer 500 in payment processing network 409 is shown. The exemplary server computer 500 is illustrated as comprising a plurality of hardware and software modules (501-509). However, it should be appreciated that this is provided for illustration purposes only, and each of the modules and associated functionality may be provided and/or performed by the same or different components. That is, exemplary server computer 500 may, for example, perform some of the relevant functions and steps described herein with reference to the payment processing network 409 through the use of any suitable combination of software instructions and/or hardware configurations. It should be noted that although the figure illustrates all of the modules located on a single device, the disclosure is not meant to be so limited. Moreover, a system for implementing the functionality described herein may have additional components or less then all of these components. Additionally, some modules may be located on other devices, such as a remote server or other local devices that are functionally connected to the server computer component(s).

The exemplary server 500 is shown as comprising a processor 501, system memory 502 (which may comprise any combination of volatile and/or non-volatile memory such as, for example, buffer memory, RAM, DRAM, ROM, flash, or any other suitable memory device), and an external communication interface 503. Moreover, one or more of the modules 504-509 may be disposed within one or more of the components of the system memory 502, or may be disposed externally. As was noted above, the software and hardware modules shown in the figure are provided for illustration purposes only, and the configurations are not intended to be limiting. The processor 501, system memory 502 and/or external communication interface 503 may be used in conjunction with any of the modules described below to provide a desired functionality. Some exemplary modules and related functionality may be as follows.

The communication module 504 may be configured or programmed to receive and generate electronic messages comprising information transmitted through the system 400 to or from any of the entities shown in FIG. 4. When an electronic message is received by the server computer 500 via external communication interface 503, it may be passed to the communications module 504. The communications module 504 may identify and parse the relevant data based on a particular messaging protocol used in the system 400. The received information may comprise, for instance, identification information, transaction information, and/or any other information that the payment processing network 409 may utilize in authorizing a financial transaction or performing a settlement and clearing procedure. The communication module 504 may then transmit any received information to an appropriate module within the server computer 500 (e.g., via a system bus line 513). The communication module 504 may also receive information from one or more of the modules in the server computer 500 and generate an electronic message in an appropriate data format in conformance with a transmission protocol used in the system 400 so that the message may be sent to one or more components within the system 400 (e.g., to an issuer computer 413 or merchant computer 407). The electronic message may then be passed to the external communication interface 503 for transmission. The electronic message may, for example, comprise an authorization response message (e.g., to be transmitted to a merchant conducting a transaction) or may be an authorization request message to be transmitted or forwarded to an issuer.

The database look-up module 505 may be programmed or configured to perform some or all of the functionality associated with retrieving information from one or more databases 516. In this regard, the database look-up module 505 may receive requests from one or more of the modules of server 500 (such as communication module 504, authorization module 508, or settlement module 509) for information that may be stored in one or more of the databases 516. The database look-up module 505 may then determine and a query an appropriate database. The database update module 506 may be programmed or configured to maintain and update the databases 516, such as authorization database 514. In this regard, the database update module 506 may receive information about a user, financial institution, a payment device, and/or current or past transaction information from one of the modules discussed herein. This information may then be stored in the appropriate location in the database using any suitable storage process.

The report generation module 507 may be programmed or configured to perform some or all of the functionality associated with generating a report regarding a user, an account, a transaction or transactions, or any other entity or category of information with regard to the system 400. This may include, for instance, identifying patterns (such as patterns that indicate a fraudulent transaction or transactions) and generating one or more alerts that may be sent (e.g., via the communication module 504 and external communication interface 503) to one or more entities in the system 400, including the user, merchant, or issuer. The report generation module may also, for example, request information from one or more of the databases 516 via database look-up module 505.

The authorization module 508 may be configured or programmed to perform some or all the functionality associated with authorizing a financial transaction associated with an authorization request message. The authorization request message may be generated by a merchant computer 407 and may be associated with a transaction involving the payment device 402. The authorization request message may include any suitable information that may be used to authorize or identify the transaction, and may be generated by the merchant computer 407 in response to an interaction between a payment device 402 or a mobile device 403 and an access device 406). The authorization module 508 may, for instance, be programmed or configured to compare the information received by via the authorization request message with stored information at the server 500 or an authorization database 514 (such as comprising verification values). In some embodiments, if the received and stored values match, the authorization module 508 may authorize the transaction (or may be more likely to authorize the transaction) and may instruct the communication module 504 to generate an authorization response message. The authorization module 508 may also be programmed or configured to execute any further operations associated with a typical authorization. As shown in the figure, various additional modules 510-512 may also be present in the server computer 500.

The payment processing network 409 may include one or more databases 516, such as authorization database 514. Each of the databases shown in this example may comprise more than one database and may be located in the same location or at different locations. The authorization database 514 may contain information related to a payment device 402 and/or a payment account, as well as any other suitable information (such as transaction information) associated with the payment account. For example, the authorization database 514 may comprise a relational database having a plurality of associated fields, including fields for a primary account identifier (e.g., a PAN), an issuer associated with the account, expiration date of a payment device 402, a verification value(s), an amount authorized for a transaction, a user name, user contact information, prior transaction data, etc. In some embodiments, the authorization module 508 may utilize some or all of the information stored in the authorization database 514 when authorizing a transaction.

The databases 516 may also comprise a number of additional databases 515.

Figure 6:
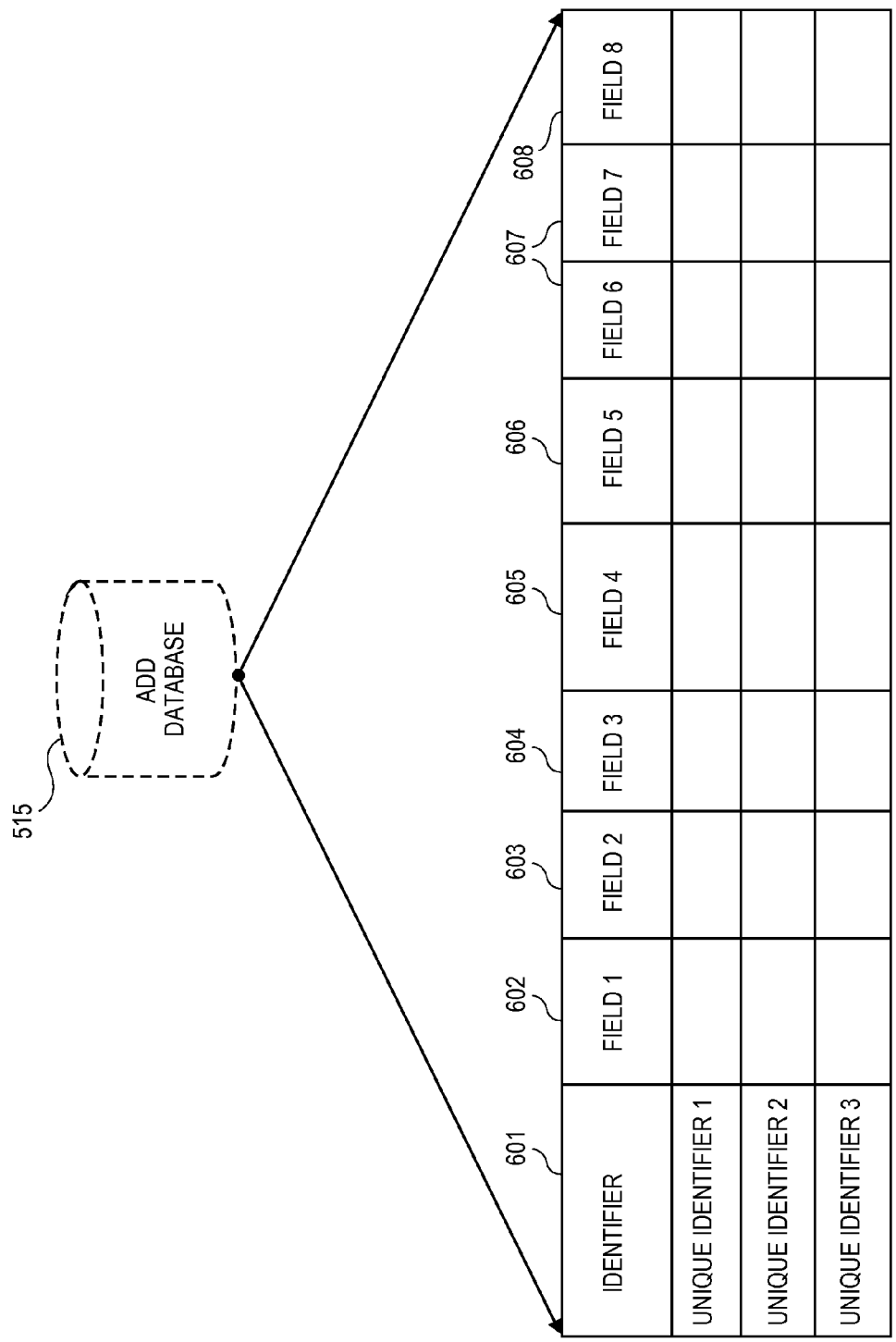
FIG. 6 shows a block diagram of an exemplary database in accordance with some embodiments.
Figure 7:
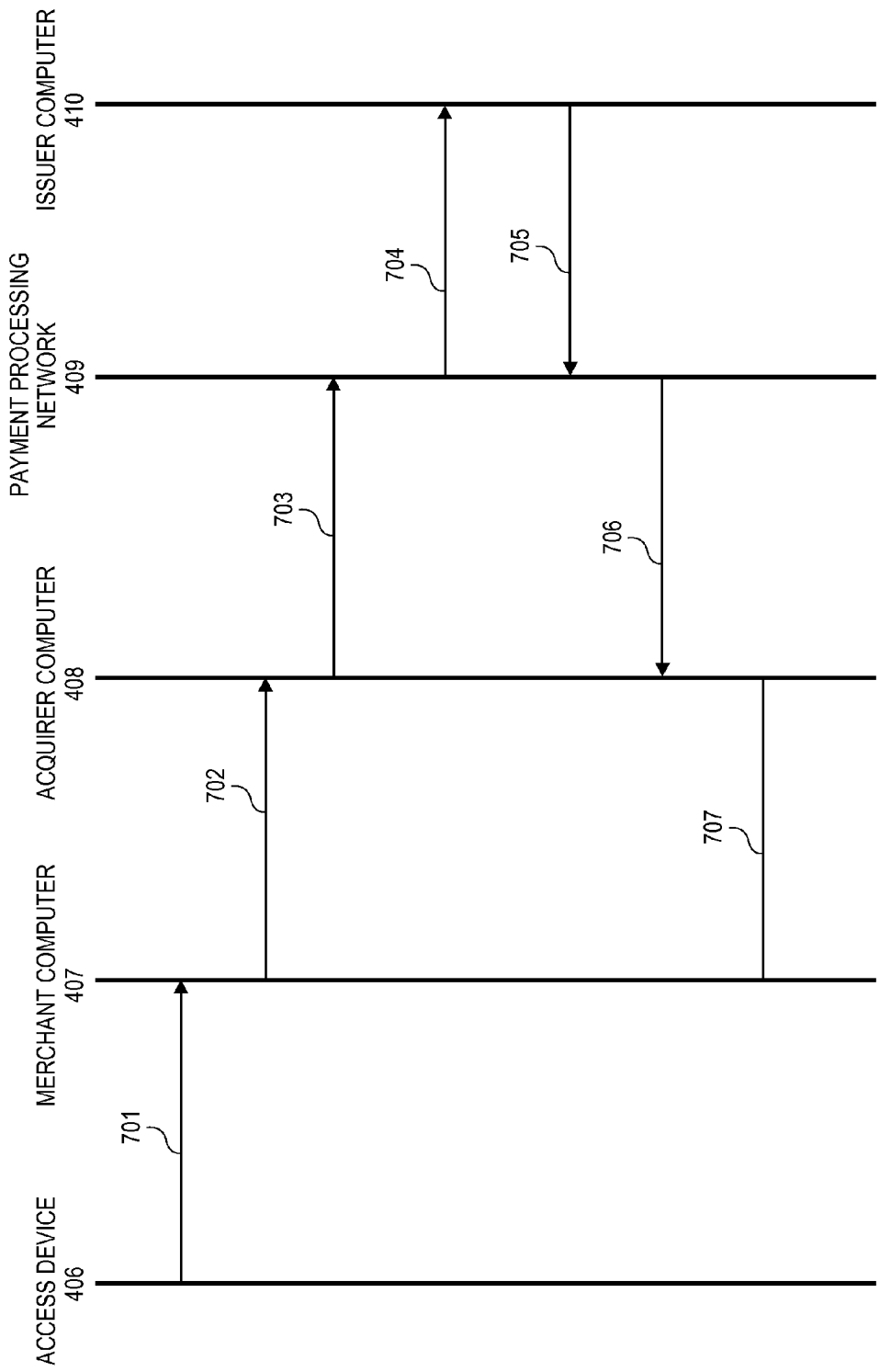
FIG. 7 shows an exemplary diagram of a financial transaction in accordance with some embodiments.

FIG. 6 shows a number of data fields 601-608, which may be associated with a number of identifiers 601 that may be unique. This data may be stored in additional databases 515.

Methods for example financial transaction systems 400 are described below with reference to the system elements in the figures. The methods described below are exemplary in nature and are not intended to be limiting. Methods in accordance with some embodiments described herein may include (or omit) some or all of the steps described below and may include steps in a different order than described herein.

A typical credit card transaction flow using a payment device 402 at an access device 406 (e.g., POS location) can be described as follows. (Note that embodiments of the invention are not limited to credit card transactions, but may also include other types of payment transactions including prepaid and debit transactions). A user 401 presents his or her payment device 402 to an access device 406 to pay for an item or service. The payment device 402 and the access device 406 interact such that information from the payment device 402 (e.g., PAN, verification value(s), expiration date) is received by the access device 406 (e.g., via contact or contactless interface). As shown in FIG. 5, the merchant computer 407 may then receive this information through message 701 from the access device 406 via the external communication interface. The merchant computer 407 may then generate an authorization request message that includes the information received from the access device 406 (i.e., information corresponding to the payment device 402) along with additional transaction information (e.g., a transaction amount, merchant specific information) and electronically transmit this information through message 702 to an acquirer computer 408. The acquirer typically represents, and vouches for, the merchant in financial transactions (e.g., credit card transactions). The acquirer computer 408 may then receive (via its external communication interface), process, and forward the authorization request message through message 703 to a payment processing network 409 (such as the server computer 500 shown in FIG. 5), for authorization.

In general, prior to the occurrence of a credit-card transaction, the payment processing network 409 has an established protocol with each issuer on how the issuer's transactions are to be authorized. In some cases, such as when the transaction amount is below a threshold value, the authorization module 508 of the payment processing network 409 may be configured to authorize the transaction based on information that it has about the user's account without generating and transmitting an authorization request message to the issuer computer 413. In other cases, such as when the transaction amount is above a threshold value, the payment processing network 409 may receive the authorization request message via its external communication interface 503, determine the issuer associated with the payment device 402, and then in message 704 forward the authorization request message for the transaction to the issuer computer 413 for verification and authorization. As part of the authorization process, the payment processing network 409 or the issuer computer 413 may analyze a verification value or other datum provided by the payment device 402. The verification value may be stored at the issuer or the payment processing network 409 (e.g., in one of the databases 516). Once the transaction is authorized, the issuer computer 413 may generate an authorization response message 705 (that may include an authorization code indicating the transaction is approved or declined) and transmit this electronic message via its external communication interface to payment processing network 409. The payment processing network 409 may then forward the authorization response message in message 706 via a communication channel to the acquirer computer 408, which in turn may then transmit through message 707 the electronic message to comprising the authorization indication to the merchant computer 407.

In the credit card industry, the authorization indication typically takes the form of an authorization code, which is five or six alphanumeric characters, by convention. It serves as proof to the merchant and the card holder that the issuing bank or payment processing network has authorized the transaction and may be used by the merchant or the card holder as proof of authorization if the issuing bank later disputes the transaction, such as during settlement. The authorization code is not the same as the card verification value (or the dCVV2 value described below) because it does not have the same purpose as the card verification value, which is to serve as proof that the card was presented to the merchant when the transaction was conducted, and cannot be entered into the CVV field of a merchant POS terminal or merchant website (which only accepts 3 or 4 numeric digits). The authorization code is also not the same as a 3-D Secure datum since it does not have the same purpose as the 3-D Secure datum, which is to serve as proof that the card was presented to the merchant when the transaction was conducted.

When a user 401 wishes to make an online purchase with a merchant over the Internet (i.e., e-commerce), a similar method as described above with reference to FIG. 4 may be performed except that the user 401 may use his computer apparatus or mobile device 403 to provide information associated with a payment device 402 (e.g., account number, user's name, expiration date, verification value) into respective fields on the merchant's checkout page (e.g., functioning as an access device 406). The access device 406 may then provide this information to the merchant computer 407, and the above steps may be performed.

Provided below are descriptions of some devices (and components of those devices) that may be used in the systems and methods described above. These devices may be used, for instance, to receive, transmit, process, and/or store data related to any of the functionality described above. As would be appreciated by one of ordinary skill in the art, the devices described below may have only some of the components described below, or may have additional components.

Figure 8:
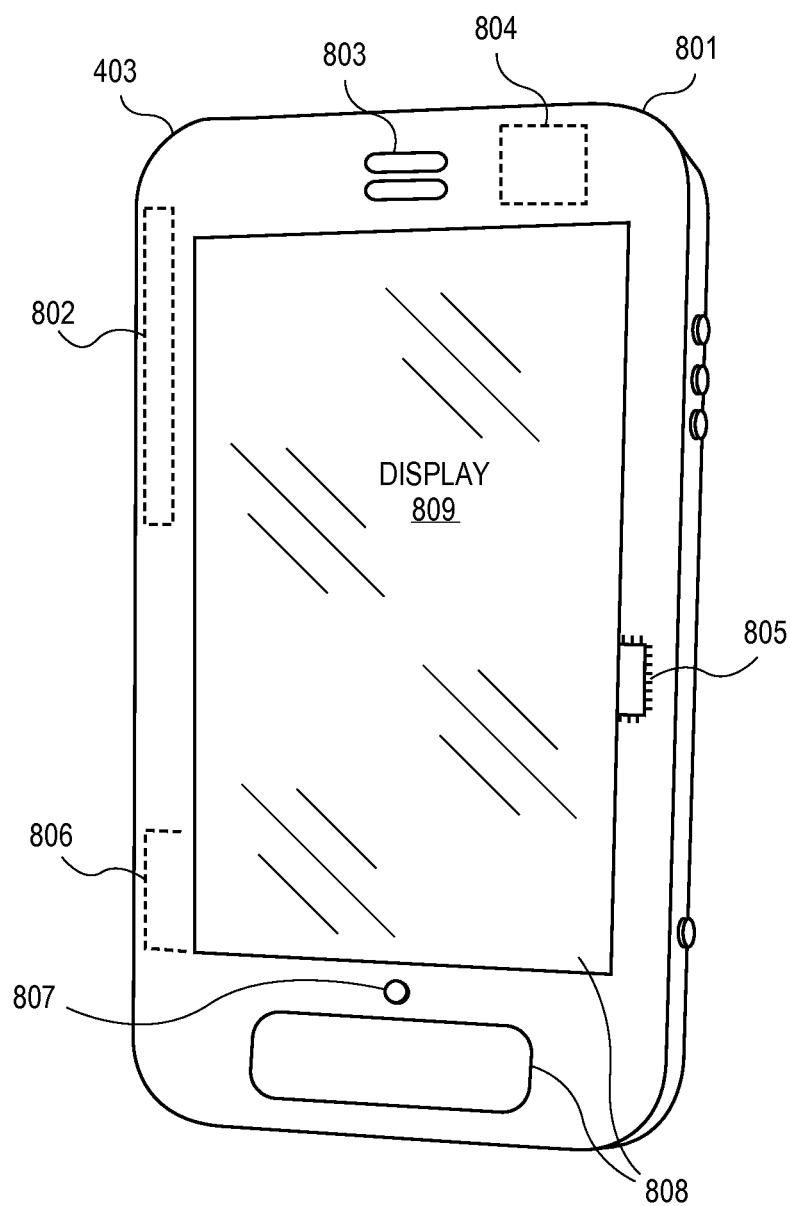
FIG. 8 shows an exemplary mobile device in accordance with some embodiments.

With reference to FIG. 8, a block diagram of an exemplary mobile device 403 is shown that may be used in some embodiments. In some embodiments, the mobile device 403 may be a notification device that can receive alert messages, a payment device that can be used to make payments, an access device (e.g., POS device) that may receive information from a consumer to conduct a transaction, and/or a multi-purpose general use device. The exemplary mobile device 403 may comprise a tangible computer readable medium 806 that may be present within the body (or outer casing) 801, or the computer readable medium 806 could be detachable from the device (e.g., the computer readable medium 806 could comprise an external memory that could be connected through a physical interface such as a USB connection, or the data could be hosted remotely and accessed wirelessly by the device—e.g. the data could be hosted and stored at a remoter server in the "cloud"). The computer readable medium 806 may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 403 (such as to an access device 406), via any suitable method, including the use of antenna 802 or contactless element 804. The body 801 may be in the form a plastic substrate, housing, or other structure.

In some embodiments, the mobile device 403 may further include a contactless element 804, which is typically implemented in the form of a semiconductor chip (or other data storage element) with an associated wireless transfer (e.g., data transmission) element, such as an antenna. Contactless element 804 may be coupled to (e.g., embedded within) the mobile device 403 and data or control instructions that are transmitted via a cellular network may be applied to the contactless element 804 by means of a contactless element interface. The contactless element interface functions to permit the exchange of data and/or control instructions between the mobile device circuitry and an optional contactless element 804, or between another device having a contactless element (e.g., a POS terminal or a payment device). Contactless element 804 may be capable of transferring and receiving data using a short range wireless communication capability. As noted above, mobile device 403 may comprise components to both be the interrogator device (e.g., receiving data) and the interrogated device (e.g., sending data). Thus, the mobile device 403 may be capable of communicating and transferring data or control instructions via both cellular network (or any other suitable wireless network—e.g. the Internet or other data network) and short range communications.

The mobile device 403 may also include a processor 805 (e.g., a microprocessor) for processing the functions of the mobile device 403 and a display 809 to allow a consumer to see phone numbers and other information and messages. The mobile device 403 may further include input elements 808 to allow a user to input information into the device, a speaker 803 to allow the user to hear voice communication, music, etc., and a microphone 807 to allow the user to transmit her voice through the mobile device 403. The mobile device 403 may also include an antenna 802 for wireless data transfer (e.g., data transmission).

Figure 9:
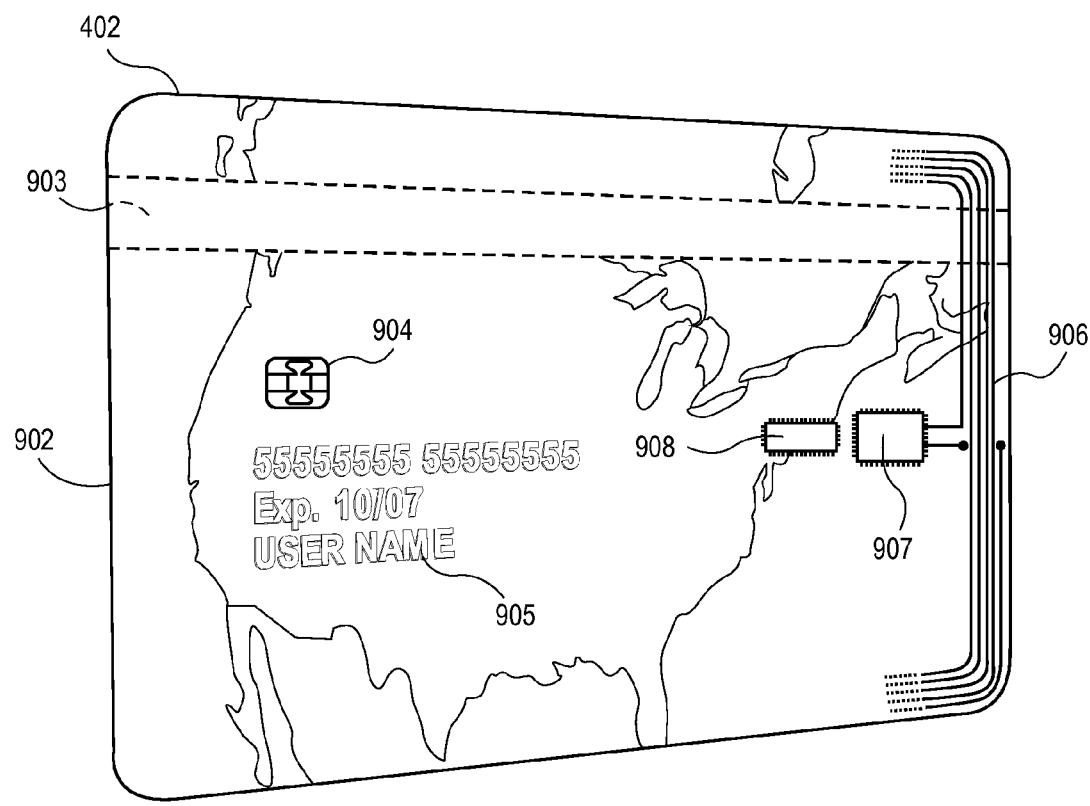
FIG. 9 shows an exemplary payment device in the form of card in accordance with some embodiments.

FIG. 9 shows an example of a payment device 402 in the form of a card. As shown, the payment device 402 comprises a plastic substrate 902. In some embodiments, a contactless element 906 for interfacing with an access device 406 may be present on, or embedded within, the plastic substrate 902. Consumer information 905, such as an account number, expiration date, and/or a user name, may be printed or embossed on the card. A magnetic stripe 903 may also be on the plastic substrate 902.

Consumer information and/or other data can be represented in track data, commonly known as Track 1, Track 2, and Track 3 data. This data encoded on magnetic stripe 903 and may also be encoded in a memory of the payment device 402.

An example of Track 1 data is:
%       B4XXXXXXXXXXXXXX2^DOE/JOHN^13051010000000100000003000000
wherein the data is as follows:

| Track 1 Data | |
|---|---|
| Track Data | Value |
| % | Start Sentinel |
| B | Format Code (B = Bank) |
| 4XXXXXXXXXXXXXX2 | Primary Account Number (PAN) |
| ^ | Field Separator |
| DOE | Last Name |
| / | Name Separator |
| John | First Name |
| ^ | Field Separator |
| 13 | Expiration Year |
| 05 | Expiration Month |
| 101 | Service Code |
| 00000000100000003000000 | Discretionary Data |
| ? | End Sentinel |
| (not shown) | Longitudinal Redundancy Check (LRC) |

An example of Track 2 data is:
; 5XXXXXXXXXXXXXX2=11031010000003 00001?
wherein the data is as follows:

| Track 2 Data | |
|---|---|
| Track Data | Value |
| ; | Start Sentinel |
| 4XXXXXXXXXXXXXX2 | Primary Account Number (PAN) |
| = | Separator |
| 13 | Expiration Year |
| 05 | Expiration Month |
| 101 | Service Code |
| 000000300001 | Discretionary Data |
| ? | End Sentinel |
| (not shown) | Longitudinal Redundancy Check (LRC) |

Track 3 data is often not used on financial cards, but it can be used where other or more detailed data is required.

Payment device 402 comprises a microprocessor 907 and memory 908. In some embodiments, payment device 402 includes one or more microprocessors and memory chips with user data stored in them.

As noted above and shown in the figure, the payment device 402 may include a magnetic stripe 903, a contact element 904, and a contactless element 906. In some embodiments, the magnetic stripe 903, the contact element 904, and the contactless element 906 may be in the payment device 402. In some embodiments, either the magnetic stripe 903, contact element 904, and/or the contactless element 906 may be present in the payment device 402.

Figure 10:
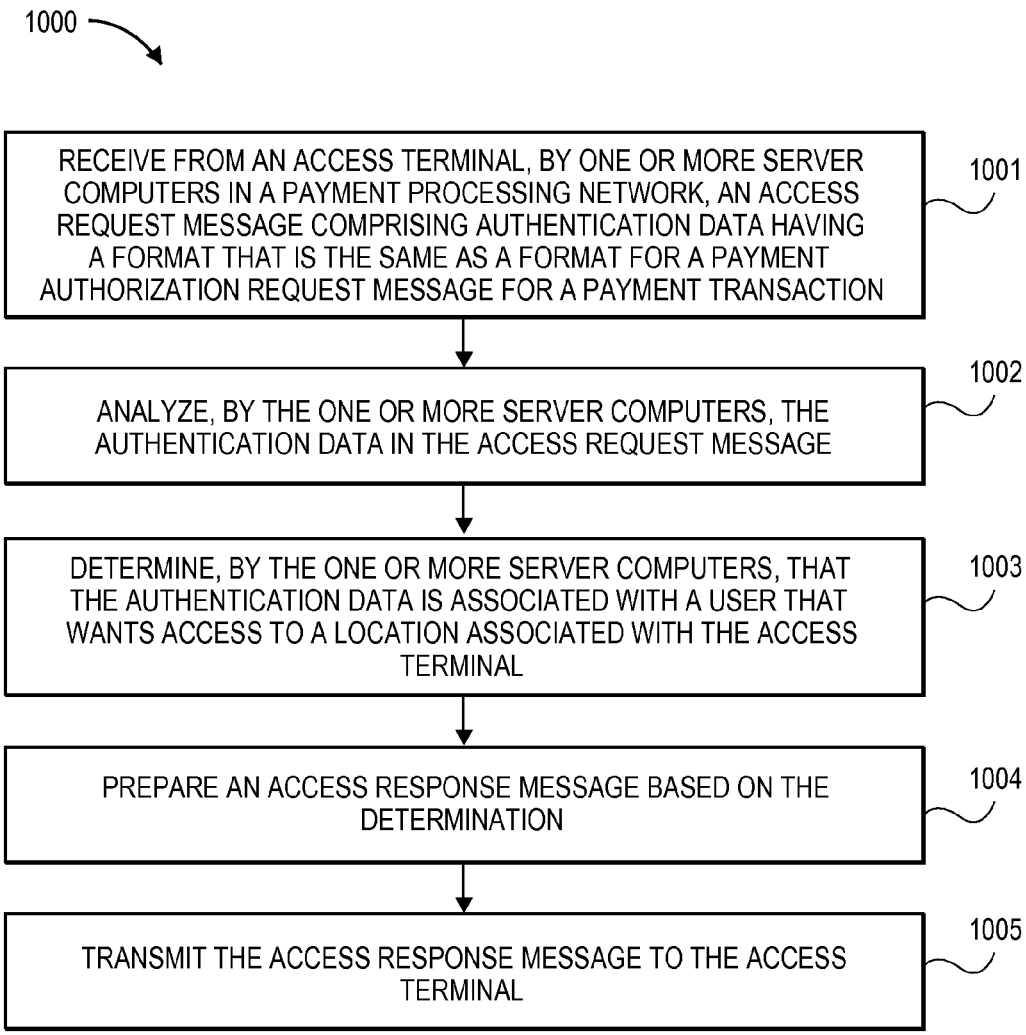
FIG. 10 is a flowchart of a process in accordance with an embodiment.

FIG. 10 is a flowchart of a process in accordance with an embodiment. In operation 1001, an access request message comprising authentication data having a format that is the same as a format for a payment authorization request message for a payment transaction is received from an access terminal by one or more server computers in a payment processing network. In operation 1002, the authentication data in the access request message is analyzed by the one or more server computers. In operation 1003, it is determined, by the one or more server computers, that the authentication data is associated with a user that wants access to a location associated with the access terminal. In operation 1004, an access response message is prepared based on the determination. In operation 1005, the access response message is transmitted to the access terminal.

Figure 11:
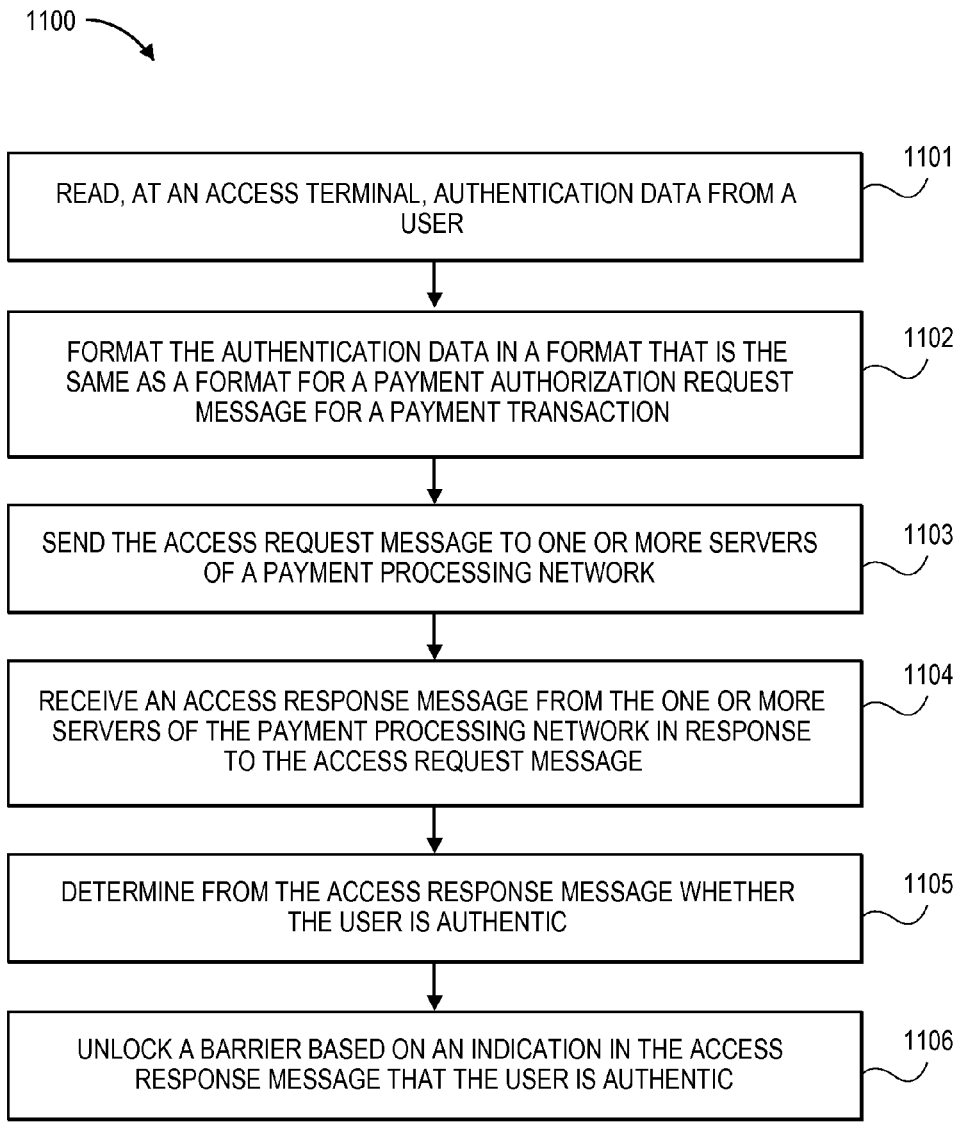
FIG. 11 is a flowchart of a process in accordance with an embodiment.

FIG. 11 is a flowchart of a process in accordance with an embodiment. In operation 1101, authentication data from a user is read at an access terminal. In operation 1102, the authentication data is formatted in a format that is the same as a format for a payment authorization request message for a payment transaction. In operation 1103, the access request message is sent to one or more servers of a payment processing network. In operation 1104, an access response message is received in response to the access request message from the one or more servers of the payment processing network. In operation 1105, it is determined from the access response message whether the user is authentic. In operation 1106, a barrier is unlocked based on an indication in the access response message that the user is authentic.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with theft full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A method comprising:
receiving from an access terminal, by one or more server computers in a payment processing network, an access request message comprising authentication data, the access request message having a format of a payment authorization request message for a payment transaction, the format being syntactically correct for the payment processing network, wherein said authentication data comprises a primary account number (PAN) and a first cryptogram, wherein the access request message is free of a transaction amount;
analyzing, by the one or more server computers, the authentication data in the access request message;
determining, by the one or more server computers, that the authentication data is associated with a user that wants access past a barrier coupled to the access terminal based at least in part on determining a bank identification number (BIN) extracted from the primary account number (PAN);
in response to determining that the bank identification number (BIN) is associated with a third party aggregator and that the access request message is free of the transaction amount, preventing, by the one or more server computers in the payment processing network, routing of the access request message to an issuer computer;
in response to determining, by the one or more server computers, that the first cryptogram included in the authentication data matches a locally generated second cryptogram, preparing, by the one or more server computers, an access response message based on the determination; and
transmitting, by the one or more server computers, the access response message to the access terminal thereby automatically unlocking the barrier coupled to the access terminal, such that the user can move past the barrier.

2. The method of claim 1 wherein the determining that the bank identification number (BIN) is associated with a third party aggregator comprises matching the BIN with an entry in a lookup table.

3. The method of claim 1 wherein the authentication data further comprises:
a client identifier;
a client transaction identifier;
an account identifier comprised of the primary account number (PAN);
a card sequence number;
an expiration date;
an indicator for track 2 data;
a currency code for a transaction amount;
an indicator of minor units for the transaction amount; and
a value of the transaction amount.

4. The method of claim 1 wherein the authentication data is from a portable consumer device read by the access terminal.

5. The method of claim 4 wherein the authentication data from the portable consumer device includes the first cryptogram, the method further comprising:
calculating, at the one or more server computers, the second cryptogram; and
comparing the first cryptogram to the second cryptogram to authenticate the portable consumer device, wherein the access response message is based on at least the comparison.

6. The method of claim 4 wherein the portable consumer device is selected from the group consisting of a plastic card with an ID-1 size conforming to International Standards Organization (ISO)/International Electrotechnical Commission (IEC) standard 7810, a key fob, and a mobile phone.

7. The method of claim 4 further comprising:
receiving, by the one or more server computers in the payment processing network, a second payment authorization request message;
ascertaining, at the one or more server computers, that the second payment authorization request message is for the payment transaction, the ascertaining based on content of the second payment authorization request message;
forwarding the second payment authorization request message to the issuer based in part on the ascertaining;
receiving, at the one or more server computers, a payment authorization response message from the issuer in response to the second payment authorization request message; and
forwarding, by the one or more server computers, the payment authorization response message.

8. A non-transitory machine-readable storable medium having collectively stored thereon instructions executable by one or more processors of a computing system in a payment processing network that, when executed by the one or more processors, cause the computing system to at least:
receive from an access terminal an access request message comprising authentication data, the access request message having a format of a payment authorization request message for a payment transaction, the format being syntactically correct for the payment processing network, wherein said authentication data comprises a primary account number (PAN) and a first cryptogram, wherein the access request message is free of a transaction amount;
analyze the authentication data in the access request message;
determine that the authentication data is associated with a user that wants access past a barrier coupled to the access terminal based at least in part on determining a bank identification number (BIN) extracted from the primary account number (PAN);
in response to determining that the bank identification number (BIN) is associated with a third party aggregator and that the access request message is free of the transaction amount, preventing, in the payment processing network, routing of the access request message to an issuer;
in response to determining that the first cryptogram included in the authentication data matches a locally generated second cryptogram, prepare an access response message; and
transmit the access response message to the access terminal thereby automatically unlocking the barrier coupled to the access terminal, such that the user can move past the barrier.

9. A computerized system in a payment processing network, comprising:
one or more processors; and
memory including instructions that, when executed by the one or more processors, cause the one or more processor to at least:
receive from an access terminal an access request message comprising authentication data, the access request message having a format of a payment authorization request message for a payment transaction, the format being syntactically correct for the payment processing network, wherein said authentication data comprises a primary account number (PAN) and a first cryptogram, wherein the access request message is free of a transaction amount;

analyze the authentication data in the access request message;

determine that the authentication data is associated with a user that wants access past a barrier coupled to the access terminal based at least in part on determining a bank identification number (BIN) extracted from the primary account number (PAN);

in response to determining that the bank identification number (BIN) is associated with a third party aggregator and that the access request message is free of the transaction amount, preventing, in the payment processing network, routing of the access request message to an issuer;

in response to determining that the cryptogram included in the authentication data matches a locally generated second cryptogram, prepare an access response message; and transmit the access response message to the access terminal thereby automatically unlocking the barrier coupled to the access terminal, such that the user can move past the barrier.

10. A system for authorizing access to an area using a payment processing network, the system comprising:

a portable consumer device having:
 a processor;
 a memory operatively coupled with the processor;
 an account identifier stored in the memory; and
 a sequence number stored in the memory,
 wherein the processor is operable to calculate a first cryptogram based on the sequence number;

one or more server computers of a payment processing network, the one or more servers configured to:
 receive, from an access terminal, an access request message having the account identifier, authentication data, and a first cryptogram, the access request message having a format of a payment authorization request message for a payment transaction and being free of a transaction amount, the format being syntactically correct for the payment processing network, the account identifier comprised of a primary account number (PAN);
 calculate a second cryptogram based on a locally stored sequence number;
 determining that the portable device is authentic by determining that the first cryptogram matches the second cryptogram;
 determine from the authentication data that is associated with a user that the user wants access past a barrier coupled to the access terminal based at least in part on determining a bank identification number (BIN) extracted from the primary account number (PAN);
 in response to determining that the bank identification number (BIN) is associated with a third party aggregator and that the access request message is free of the transaction amount, prevent, in the payment processing network, routing of the access request message to an issuer;
 in response to the determining that the portable device is authentic, prepare an access response message; and
 transmit the access response message to the access terminal thereby automatically unlocking the barrier coupled to the access terminal, such that the user can move past the barrier.

11. The system of claim 10 further comprising:
the access terminal configured to read the portable consumer device; and
a locking device configured to release the barrier based upon the access response message from the one or more servers of the payment processing network.

12. The system of claim 10 wherein the one or more servers are further configured to:
receive a second payment authorization request message having a second account identifier from a second portable consumer device;
forward the second payment authorization request message to the issuer;
receive a payment authorization response message in response to the second payment authorization request message; and
forward the payment authorization response message.

13. The system of claim 12 wherein second payment authorization request message has a third cryptogram and the one or more servers are further configured to:
calculate a fourth cryptogram based on a locally stored sequence number;
compare the third and fourth cryptograms; and
modify the payment authorization response message based on the comparison of the third and fourth cryptograms.

* * * * *